(12) United States Patent
Hossu

(10) Patent No.: US 8,149,408 B2
(45) Date of Patent: Apr. 3, 2012

(54) DEVICE FOR MEASURING ELEVATIONS AND/OR DEPRESSIONS IN A SURFACE

(76) Inventor: Dan Hossu, Weiersbach (DE)

( * ) Notice: Subject to any disclaimer, the term of this patent is extended or adjusted under 35 U.S.C. 154(b) by 177 days.

(21) Appl. No.: 12/091,408

(22) PCT Filed: Oct. 20, 2006

(86) PCT No.: PCT/DE2006/001853
§ 371 (c)(1),
(2), (4) Date: Apr. 24, 2008

(87) PCT Pub. No.: WO2007/048388
PCT Pub. Date: May 3, 2007

(65) Prior Publication Data
US 2008/0225297 A1  Sep. 18, 2008

(30) Foreign Application Priority Data
Oct. 24, 2005  (DE) .................. 10 2005 050 807

(51) Int. Cl.
*G01N 21/55* (2006.01)
(52) U.S. Cl. .......... 356/445; 356/71; 356/73; 250/227.2
(58) Field of Classification Search .......... 356/600, 356/445–448, 73, 71; 250/556, 227.11, 227.19, 250/227.2; 382/124–127
See application file for complete search history.

(56) References Cited

U.S. PATENT DOCUMENTS

| 4,785,171 | A | * | 11/1988 | Dowling et al. | 250/227.28 |
|---|---|---|---|---|---|
| 4,846,184 | A | * | 7/1989 | Comment et al. | 600/306 |
| 4,881,268 | A | * | 11/1989 | Uchida et al. | 382/135 |
| 5,198,875 | A | * | 3/1993 | Bazin et al. | 356/369 |
| 5,426,296 | A | * | 6/1995 | Shikai et al. | 250/227.2 |
| 5,917,180 | A | * | 6/1999 | Reimer et al. | 250/227.14 |
| 6,111,650 | A | * | 8/2000 | Rawicz et al. | 356/402 |
| 6,195,448 | B1 | | 2/2001 | Schiller | |
| 6,927,844 | B2 | * | 8/2005 | Higuchi et al. | 356/71 |
| 7,127,280 | B2 | * | 10/2006 | Dauga | 600/407 |
| 2001/0056237 | A1 | * | 12/2001 | Cane et al. | 600/475 |
| 2003/0044051 | A1 | | 3/2003 | Fujieda | |

FOREIGN PATENT DOCUMENTS

| DE | 100 02 767 | 7/2001 |
|---|---|---|
| WO | WO-01/69520 | 9/2001 |

OTHER PUBLICATIONS

English abstract for DE-100 02 767.

* cited by examiner

*Primary Examiner* — Hoa Pham
(74) *Attorney, Agent, or Firm* — Rader, Fishman & Grauer PLLC

(57) ABSTRACT

In a device for measuring elevations and/or depressions of a flexible surface which is at least partially transmissive to light, for measurement purposes, the surface is illuminated by a fiber-optical means (3) by way of a light source (7) and the brightness of the reflected light is measured by the same fiber-optical means using a photosensor (1).

23 Claims, 1 Drawing Sheet

DEVICE FOR MEASURING ELEVATIONS AND/OR DEPRESSIONS IN A SURFACE

This application is a National Stage application which claims the benefit of International Application No. PCT/DE2006/001853 filed Oct. 20, 2006, which claims priority based on DE 10 2005 050 807.3 filed Oct. 24, 2005, each of which is hereby incorporated by reference their entirety.

TECHNICAL FIELD

The invention relates to a device for measuring elevations and/or depressions of a flexible, at least partially transparent surface and to a method for identifying a fingerprint or handprint or footprint according to the preamble of Claim 18.

BACKGROUND

Fingerprint identification systems usually include capacitive or optical surface-area sensors for identifying characteristic features of a fingertip. The detected signals are often compared by a detecting device with fingerprint features of authorized persons, with these features being stored in a memory. If the fingerprint detected by the fingerprint sensor matches a stored fingerprint pattern in terms of essential features, the detecting device outputs a corresponding signal to an evaluation and control device, which unlocks, for example, a door lock. If an unauthorized person, for example, attempts to gain access, this is identified by a comparison of the detected fingerprint features of the unauthorized person with the stored fingerprint features and signal transmission to the evaluation and control device is either blocked or a failed-attempt signal is transmitted. The reliable identification of deceptive attempts, for example, a severed finger of an authorized person or a film or the like with the fingerprint of an authorized person, has proven to be problematic.

DE 20 2004 001 624 U1 discloses a fingerprint verification device with at least one fingerprint detecting device connected to an evaluation and control device. The fingerprint detecting device has a line sensor and evaluation electronics and the evaluation and control device is connected to an access-control device, in particular, with a break-in alarm system. In order to increase security standards, line sensors are provided that are less easy to sabotage than surface-area sensors, since an image of the entire fingertip is generated successively by slowly moving the finger over the line sensor. In addition, the line sensor has several resistive, temperature-dependent elements, in order to prevent incorrect identification through the use of a film with a fingerprint of an authorized person or a severed finger of an authorized person.

In addition, DE 699 20 126 T2 shows a fingerprint reading device with a light source, a photosensor device, which includes several photosensors constructed on the light source and also a surface constructed on the photosensors, and a transparent layer that is transparent to light and that is constructed on the photosensor device. In order to recognize the use of a fingerprint copied onto a sheet of paper, the electrical resistance of a finger, which is not present when a sheet is used, is detected in the fingerprint reading device when the two-dimensional photosensor having a pair of transparent conductive layers is contacted by a finger.

SUMMARY

The task of the invention is to create a device and a method of the type named above, with which identification is to be performed reliably.

According to the invention, the task is achieved for the device in that, for measurement purposes, the surface is illuminated through an optical fiber by means of a light source and the brightness of the reflected light is measured with a photosensor through the same optical fiber.

In the incident light method, light radiation is transmitted from the light source, which for example, emits infrared radiation, by means of the glass fiber strands of the fiber optics, that is, relatively thin fibers with a diameter of ca. 6 µm, to the surface to be scanned, in particular, a finger, and light radiation reflected by the surface is transmitted to the photosensor. The transmission of the light radiation is realized through the same fiber of the fiber optics. The optical characteristic of optical fibers, wherein the light beam at the output is coupled into the medium located there better or worse depending on the refractive index of the medium, is taken advantage of, and therefore less or more light is reflected back into the glass fiber of the fiber optics. Human skin behaves like a medium with a higher refractive index than air. The surface with the glass fiber strands is relatively insensitive to scratches, and normal wear does not affect the measurement values. In addition, an image is produced that is richer in contrast compared with the use of a glass plate as the surface. In the construction, light sources are arranged underneath the surface. By means of the incident light method, the device can better register changes in brightness in the reflected light for a relatively low radiation intensity compared with the transmitted-light method, and can simultaneously determine elevations and depressions involved in the surface. In addition, the measurement method with incident light is independent of the thickness of the surface or its external color, and is affected only minimally by ambient light, which is why is delivers relatively easily reproducible results.

Glass fiber strands integrally connected to form a fiber-optic plate are preferred. In this way, the fiber or fiber optics include a plurality of glass fibers arranged in parallel as optical waveguides, which are fused into a mechanically homogeneous block.

Advantageously, each optical fiber is oriented with its longitudinal axis perpendicular to a contact face for the surface, in particular, for a finger. In this way, it is possible for the measurement object, that is, the surface in particular of a finger, to be illuminated by a fiber and for the light absorption or reflection to be measured through the same fiber.

To achieve good coupling of the light in the individual optical fibers and to prevent a transmitted-light effect from an adjacent optical fiber, advantageously a non-reflective, in particular, matted surface is associated with the end of the optical fiber. Here it is possible to associate a separate component with the optical fiber, for example, in the form of a matte-surfaced plate, or to process the optical fiber itself accordingly. Advantageously, the end of the optical fiber facing the light source has a non-reflective coating. In construction, for the non-reflective coating or matte finish, the optical fiber is coated with anti-reflection thin films or a matte varnish or bonded to a matte film. The surface coating with anti-reflection thin films is known, for example, from eyeglasses or lenses.

Furthermore, for differentiating real fingers from fakes, either several light sources emitting light of different wavelengths are provided, or a color-detecting photosensor is used. When a real finger, that is, a finger of a living person, is placed, blood is forced from the tissue of the fingertip, which is a part supplied with a lot of blood, in the vicinity of the contact point of the finger on the surface associated with the photosensor due to the contact pressure exerted, which causes a detectable dynamic change in color or brightness of the light beams reflected to the photosensor. For this measurement of the change in color, it is necessary to provide either several light sources emitting light of different colors, or to provide a color-detecting photosensor, in order to detect changes in the outer skin layer. The device also works with a transmitted-light method for a corresponding intensity of the light radiation. Obviously, the use of the optical fiber as a light-transmitting surface is also possible, with the already explained advantages. Through the use of the optical fiber, it is also possible to couple the change in color with the fingerprint and to evaluate the measurement of the existing elevations and depressions of the fingerprint differently, in order to increase the defense against fakes.

Advantageously, the light sources emit white, red, green, and/or blue, in particular, infrared light. The light sources are turned on in sequence, and the reflected light is detected with the photosensor and also processed with a computer-controlled evaluation unit.

Preferably, the light sources are constructed as light-emitting diodes, which are inexpensive components.

In order to reliably detect the changes in brightness and color that occur with the use of white light, advantageously at least one color filter is associated with the photosensor. With the arrangement, in particular, of several color filters, it is also possible to turn on simultaneously all of the light sources that emit light of different colors.

In a different construction, the photosensor is constructed as a camera. The camera can include, for example, a CCD component (charge-coupled device) or a CMOS sensor (complementary metal oxide semiconductor).

According to the invention, the problem is solved in a method with the features of Claim 18.

By placing a finger of a living person on the measurement surface, blood leaves the tissue of the fingertip in the vicinity of the contact point and the reflected and also absorbed light radiation change in terms of their measured portion and also their spectrum. This change decreases over the course of time, and is greatest in the first ca. 300 ms after placement of the finger and can be measured up to ca. 1500 ms, which is why several brightness measurements are performed within this time span and these measurements allow a conclusion to be reached on whether the object is the finger of a living person or a severed finger or some other fake.

In order to begin the brightness measurements relatively quickly after placement of the finger, preferably the contact of the measurement surface with skin is detected with a capacitive or resistive measurement method. These measurement methods are sufficiently well known to someone skilled in the art of fingerprint identification.

According to a different construction, a light source with a different color is turned on for each brightness measurement. Through the different colors used in the different brightness measurements, the security in the detection of fakes is increased significantly. Alternatively, all of the light sources are turned on simultaneously, or at least one light source emitting white light is turned on and incident light wavelengths for the brightness measurements are differentiated with color filters associated with a color sensor or the camera sensor. Obviously, an IR or UV light source can also be used. Furthermore, ambient light, such as, e.g., natural daylight or room lighting, can also be used on the sensor side.

Advantageously, the light sources are pulsed, controlled, or supplied with voltage continuously by the evaluation and control unit.

It is understood that the previously mentioned features and the features still to be explained below can be used not only in the specified combination, but also in other combinations. The scope of the invention is defined only by the claims.

BRIEF DESCRIPTION OF THE DRAWING

The invention is explained in more detail below using an embodiment, with reference to the associated drawings. Shown are.

DETAILED DESCRIPTION

Figure 1:
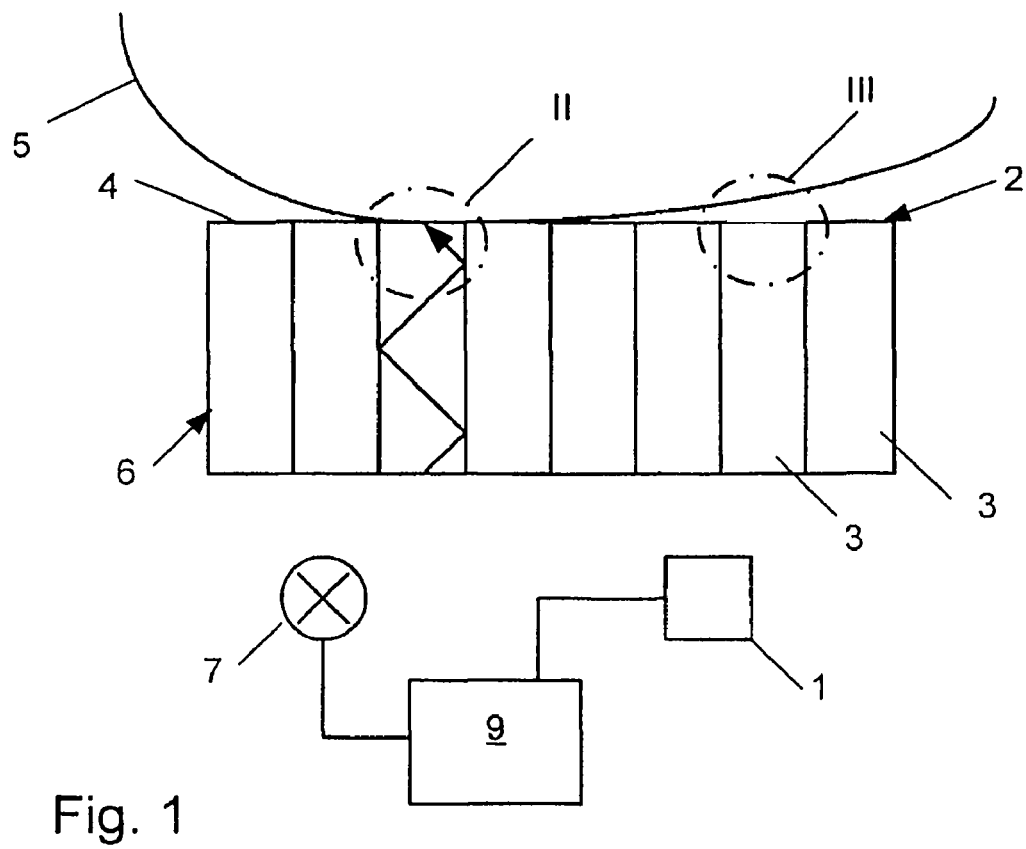
FIG. 1, a schematic section diagram of a fingerprint identification system according to the invention, FIG. 2, a diagram of the detail II according to FIG. 1, and FIG. 3, a diagram of the detail III according to FIG. 1.
Figure 2:
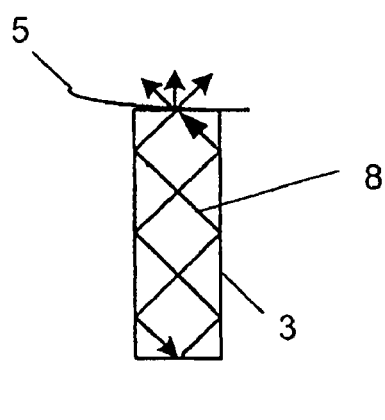
Figure 3:
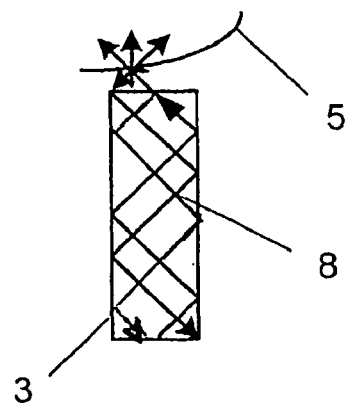

The fingerprint identification system includes an optical photosensor 1 made from a plurality of glass fiber strands 3, that is optical fibers, which are arranged in parallel under a surface 2 and are oriented with their longitudinal axes perpendicular to a contact face 4 for a finger 5, and which are fused into a homogeneous block 6 (fiber-optic plate). Underneath the block 6, which includes a plurality of optical fibers and forms a fiber-optic plate, there is a light source 7, which is arranged next to the photosensor 1 constructed as a CMOS or CCD camera and whose light beams 8 are led through the glass fiber strands 3 to the finger 5 and there partially absorbed and partially reflected. The light reflected back into the optical fiber is less in regions in which the finger 5 is placed on the surface 2 than in regions in which the finger 5 is positioned away from the surface 2, which is caused by the fact that the light couples better into the finger 5 than into air because the finger 5 has a higher refractive index than air.

When a finger 5 that is part of a living person is placed, blood is forced from the tissue due to the contact pressure on the contact face 4, which causes a change in the brightness of the reflected light beams, and this change is detected by the photosensor 1 in several brightness measurements following immediately one after the other. In addition, the photosensor 1 constructed as a camera obviously also detects the elevations and depressions of the fingerprint of the finger 5 due to the reflected light beams. Because the photosensor 1 detects different colors or the illumination is performed in sequence in different spectral ranges, in addition to the dynamic change in the brightness, changes in color are also registered when the finger 5 is placed on the surface 2, wherein changes in both brightness and also color are smaller in regions in which the finger 5 is placed on the surface 2 than in regions in which the finger 5 is positioned away from the surface 2. All of the measurement values of the photosensor 1 are processed by an evaluation and control unit 9 and compared, for example, with stored fingerprints. In addition, the evaluation and control unit 9 is connected to the light source 7 in order to supply this with power.

The invention claimed is:

1. A device for measuring elevations and/or depressions of a flexible surface, comprising:
at least one light source configured to illuminate the surface;
a photosensor configured to assess the brightness of light at a contact face of at least one optical fiber, wherein the light is reflected off the surface; and
the at least one optical fiber configured to transmit the light from the light source to the surface and the same at least one optical fiber is configured to transmit the reflected light from the surface to the photosensor without directing the light through a mirror or a prism.

2. The device according to claim 1, further comprising:
a fiber-optic plate including a first end of the at least one optical fiber proximate to the surface; and
the contact face for the surface provided by the fiber-optic plate.

3. The device according to claim 2, wherein the at least one optical fiber is oriented with its longitudinal axis perpendicular to the contact face.

4. The device according to one of claim 1, further comprising a nonreflective end of the at least one optical fiber proximate to the light source.

5. The device according to claim 4, wherein the non-reflective end has an antireflective coating including one of an anti-reflection thin film, a matte varnish, and a matte film.

6. The device according to one of claim 1, wherein the photosensor is a two-dimensional sensor.

7. The device according to one of claim 1, further comprising a camera associated with the photosensor.

8. The device according to claim 1, wherein the at least one light source emits light of different wavelengths.

9. The device according to claim 1, wherein the photosensor is configured for detecting a plurality of colors.

10. The device according to one of claim 1, wherein the at least one light source emits at least one of white, red, green, blue, and infrared light.

11. The device according to one of claim 1, wherein the at least one light source is a light-emitting diode.

12. The device according to one of claim 1, further comprising at least one color filter associated with the photosensor.

13. The device according to one of claim 1, further comprising a neutral-grey filter for increasing insensitivity to ambient light associated with the photosensor.

14. The device according to one of claim 13, further comprising a fiberoptic plate including a first end of the at least one optical fiber proximate to the surface, wherein the neutral-grey filter is associated with the fiber-optic plate.

15. The device according to claim 14, wherein the neutral-grey filter is arranged in the cladding of the optical fiber.

16. A method for identifying skin patterns including elevations and/or depressions thereof, comprising:
providing a contact face, an optical photosensor and at least one light source transmitting light through at least one path to the contact face and coupled with an evaluation and control unit without directing the light through a mirror or a prism;
detecting skin abutting the contact face;
reading at least one brightness measurement at the contact face and through the same at least one path with the photosensor without directing the light through a mirror or a prism; and
evaluating the brightness measurement reflected from the contact face with the evaluation and control unit.

17. The method according to claim 16, further comprising performing the detecting with one of a capacitive, resistive, and optical measurement technique.

18. The method according to claim 17, further comprising:
simultaneously emitting at least one of white, red, green, blue, and infrared light from the at least one light source; and
distinguishing incident light wavelengths for the brightness measurements with a color filter associated with the photosensor.

19. The method according to claim 17, further comprising supplying a voltage to the at least one light source in one of a pulsed, a controlled, and a continuous manner by the evaluation and control unit.

20. The method according to claim 17, wherein the light source is one of a natural light source, ambient lighting, and a light emitting diode.

21. The method according to claim 17, further comprising measuring the elevations and depressions of the skin separately.

22. A method for differentiating a live human extremity from a fake, comprising:
applying at least one light source through at least one fiber to a skin surface of the extremity positioned on a contact face of the at least one fiber without directing light through a mirror or a prism;
reading at least one brightness measurement of the skin, through the same at least one fiber, subjected to incident light with a photosensor without directing light through a mirror or a prism; and
detecting blood displacement in the extremity based on the brightness measurement reflected directly at the contact face, including identifying changes in at least one spectral range in the first 300 to 1500 ms after the applying.

23. The method according to claim 22, wherein the at least one spectral range is at least one of the red range and the infrared range of light.

* * * * *